United States Patent
Niina et al.

(10) Patent No.: US 10,374,205 B2
(45) Date of Patent: Aug. 6, 2019

(54) NONAQUEOUS ELECTROLYTE SECONDARY BATTERY

(71) Applicant: SANYO Electric Co., Ltd., Daito-shi, Osaka (JP)

(72) Inventors: Fumiharu Niina, Hyogo (JP); Daisuke Nishide, Hyogo (JP); Atsushi Fukui, Hyogo (JP)

(73) Assignee: SANYO Electric Co., Ltd., Daito-shi (JP)

(*) Notice: Subject to any disclaimer, the term of this patent is extended or adjusted under 35 U.S.C. 154(b) by 0 days.

(21) Appl. No.: 15/556,929

(22) PCT Filed: Mar. 8, 2016

(86) PCT No.: PCT/JP2016/001244
§ 371 (c)(1),
(2) Date: Sep. 8, 2017

(87) PCT Pub. No.: WO2016/157736
PCT Pub. Date: Oct. 6, 2016

(65) Prior Publication Data
US 2018/0034032 A1    Feb. 1, 2018

(30) Foreign Application Priority Data
Mar. 31, 2015 (JP) ................. 2015-072531

(51) Int. Cl.
*H01M 4/13* (2010.01)
*H01M 2/18* (2006.01)
(Continued)

(52) U.S. Cl.
CPC ........... *H01M 2/18* (2013.01); *H01M 2/1653* (2013.01); *H01M 4/13* (2013.01); *H01M 4/134* (2013.01);
(Continued)

(58) Field of Classification Search
CPC ............... H01M 2/18; H01M 2/1653; H01M 2004/028; H01M 2220/20;
(Continued)

(56) References Cited

U.S. PATENT DOCUMENTS

| 8,986,880 B2* | 3/2015 | Odani | H01M 10/0567 |
| | | | 429/199 |
| 2010/0009249 A1* | 1/2010 | Tojo | H01M 2/1653 |
| | | | 429/129 |

(Continued)

FOREIGN PATENT DOCUMENTS

| CN | 102195088 A | 9/2011 |
| CN | 102394283 A | 3/2012 |

(Continued)

OTHER PUBLICATIONS

Office Action dated Jan. 2, 2019, issued in counterpart Chinese Application No. 201680013929.5, with English translation (3 pages).

*Primary Examiner* — Jane J Rhee
(74) *Attorney, Agent, or Firm* — Westerman, Hattori, Daniels & Adrian, LLP (57) ABSTRACT

It is an object of the present invention to improve the low-temperature output characteristics of a nonaqueous electrolyte secondary battery. A nonaqueous electrolyte secondary battery according to an embodiment includes an electrode assembly having a structure in which a positive electrode and a negative electrode are stacked with a porous separator provided therebetween. The positive electrode contains tungsten and a phosphate compound. The separator contains a material having higher oxidation resistance than a polyethylene and has a pore distribution peak sharpness index of 40 or more in the range of 0.01 μm to 10 μm as calculated using formula 1: formula 1: pore distribution peak sharpness index=(peak value of Log differential pore vol- (Continued)

ume)/(difference between maximum pore size and minimum pore size at position corresponding to ½ peak value of Log differential pore volume).

5 Claims, 3 Drawing Sheets (51) Int. Cl.
| | |
|---|---|
| H01M 4/62 | (2006.01) |
| H01M 10/052 | (2010.01) |
| H01M 2/16 | (2006.01) |
| H01M 4/134 | (2010.01) |
| H01M 4/136 | (2010.01) |
| H01M 4/38 | (2006.01) |
| H01M 10/0525 | (2010.01) |
| H01M 4/48 | (2010.01) |
| H01M 4/133 | (2010.01) |
| H01M 4/02 | (2006.01) |

(52) U.S. Cl.
CPC ............ *H01M 4/136* (2013.01); *H01M 4/38* (2013.01); *H01M 4/483* (2013.01); *H01M 4/62* (2013.01); *H01M 10/052* (2013.01); *H01M 10/0525* (2013.01); *H01M 4/133* (2013.01); *H01M 2004/028* (2013.01); *H01M 2220/20* (2013.01); *H01M 2220/30* (2013.01); *Y02T 10/7011* (2013.01)

(58) Field of Classification Search
CPC .... H01M 2004/30; H01M 4/13; H01M 4/134; H01M 4/136; H01M 4/38; H01M 4/483; H01M 4/62; H01M 4/133; H01M 10/052; H01M 10/0525

See application file for complete search history.

(56) References Cited

U.S. PATENT DOCUMENTS

| | | |
|---|---|---|
| 2011/0217598 A1 | 9/2011 | Kawashima et al. |
| 2012/0034503 A1 | 2/2012 | Toyama et al. |

FOREIGN PATENT DOCUMENTS

| | | |
|---|---|---|
| JP | 2010-40383 A | 2/2010 |
| JP | 2012-38534 A | 2/2012 |
| WO | 2014/128903 A1 | 8/2014 |

* cited by examiner

NONAQUEOUS ELECTROLYTE SECONDARY BATTERY

TECHNICAL FIELD

The present disclosure relates to a nonaqueous electrolyte secondary battery.

BACKGROUND ART

Nonaqueous electrolyte secondary batteries are used as power sources to drive electric power tools, electric vehicles (EVs), hybrid vehicles (HEVs and PHEVs) as well as in consumer applications, for example, mobile information terminals such as cellular phones, notebook personal computers, and smartphones and are expected to be more widely used. In particular, the prevalence of lithium ion secondary batteries has recently been further accelerated because of their high capacity and high power. Lithium ion secondary batteries are required to meet predetermined safety when subjected to an overcharge test.

In connection with this, PTL 1 discloses that the use of a positive electrode having a surface covered with a covering layer containing a phosphate compound and an oxide containing at least one of tungsten (W), molybdenum (Mo), and zirconium (Zr) inhibits heat generation at the time of overcharging to improve the safety.

CITATION LIST

Patent Literature

PTL 1: International Publication No. 2014/128903

SUMMARY OF INVENTION

Technical Problem

In the lithium ion secondary battery disclosed in PTL 1, however, the output power at a low temperature is insufficient, in some cases.

Solution to Problem

A nonaqueous electrolyte secondary battery according to an embodiment of the present disclosure includes an electrode assembly having a structure in which a positive electrode and a negative electrode are stacked with a porous separator provided therebetween, in which the positive electrode contains tungsten and a phosphate compound, and the separator contains a material having higher oxidation resistance than a polyethylene and has a pore distribution peak sharpness index of 40 or more in the range of 0.01 μm to 10 μm as calculated using formula 1:

pore distribution peak sharpness index=(peak value of Log differential pore volume)/(difference between maximum pore size and minimum pore size at position corresponding to ½ peak value of Log differential pore volume).    formula 1:

Advantageous Effects of Invention

The nonaqueous electrolyte secondary battery according to an embodiment of the present disclosure has improved low-temperature output characteristics.

BRIEF DESCRIPTION OF DRAWINGS

In FIG. 3, (a) is a schematic diagram illustrating a film formation state on a negative electrode of a nonaqueous electrolyte secondary battery according to an embodiment, and (b) is a schematic diagram illustrating a film formation state on a negative electrode of a nonaqueous electrolyte secondary battery according to a comparative embodiment.

DESCRIPTION OF EMBODIMENTS

In a nonaqueous electrolyte secondary battery according to an embodiment of the present disclosure, a good (low-resistance) surface film containing tungsten originating from the positive electrode can be formed on a negative electrode by changing the rate of dissolution of tungsten in a nonaqueous electrolyte with a positive electrode containing tungsten and a phosphate compound. A separator contains a material having higher oxidation resistance than polyethylene and has a pore distribution peak sharpness index of 40 or more. This can inhibit the degradation of the separator due to oxidation, so that tungsten eluted from the positive electrode is not trapped by the oxidation effect of the separator; thus, the good (low-resistance) surface film can be uniformly formed on the negative electrode. As a result, an increase in the resistance of the negative electrode of the nonaqueous electrolyte secondary battery can be inhibited even in a low-temperature environment, thereby improving the low-temperature output characteristics of the nonaqueous electrolyte secondary battery.

Embodiments will be described in detail below. The drawings to which reference will be made in the Description of Embodiments are schematically illustrated. For example, the dimensional ratios of constituent elements in the drawings are not always the same as those of the actual objects. Specific dimensional ratios and other features are to be understood from the description provided below.

<Structure of Nonaqueous Electrolyte Secondary Battery>

Figure 1:
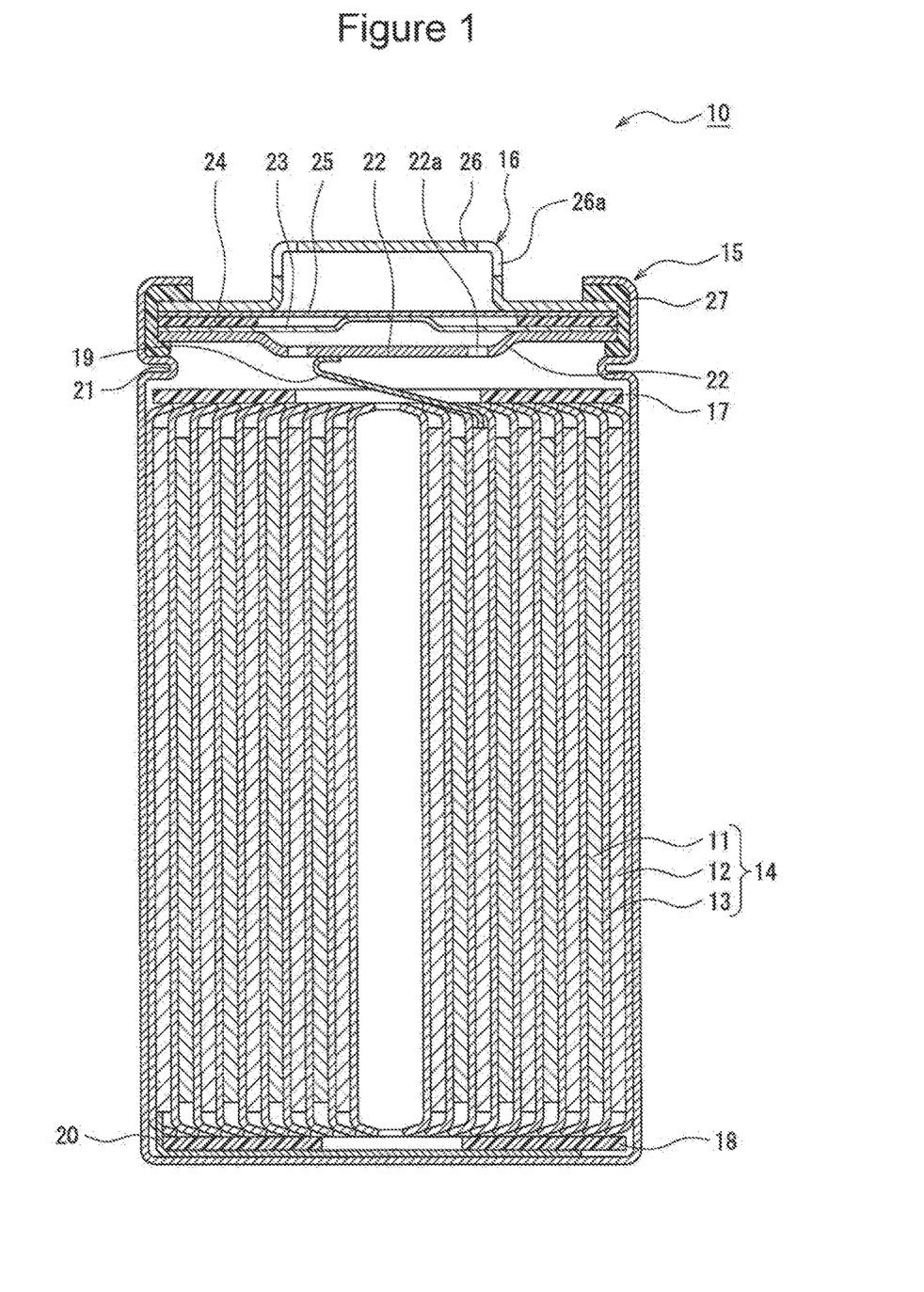
FIG. 1 is a cross-sectional view of a nonaqueous electrolyte secondary battery according to an embodiment.

FIG. 1 is a cross-sectional view of a nonaqueous electrolyte secondary battery 10 according to an embodiment.

The nonaqueous electrolyte secondary battery 10 includes a positive electrode 11 in which a positive electrode mixture layer is arranged on a positive electrode current collector, a negative electrode 12 in which a negative electrode mixture layer is arranged on a negative electrode current collector, and a nonaqueous electrolyte. The positive electrode 11 and the negative electrode 12 are included in an electrode assembly 14 having a structure in which the positive electrode 11 and the negative electrode 12 are stacked with a porous separator 13 provided therebetween. More specifically, the electrode assembly 14 is, for example, a wound-type electrode assembly in which the positive electrode 11 and the negative electrode 12 are wound with the separator 13 provided therebetween. The nonaqueous electrolyte secondary battery 10 has a structure in which the electrode assembly 14 and the nonaqueous electrolyte are placed in a battery case. A different-type electrode assembly, such as a stacked-type electrode assembly in which a positive electrode and a negative electrode are alternately stacked, may be used, in place of the wound-type electrode assembly 14. Examples of the battery case that accommodates the electrode assembly 14 and the nonaqueous electrolyte include metal cases and resin cases (laminated-type battery), formed by laminating resin sheets together, having, for example, cylindrical, prismatic, coin, and button shapes. In an embodiment illustrated in FIG. 1, a battery case includes a case main body 15 having a bottomed cylindrical shape and a sealing component 16.

The nonaqueous electrolyte secondary battery 10 includes insulating plates 17 and 18 arranged on the top and the bottom of the electrode assembly 14. In this embodiment illustrated in FIG. 1, a positive electrode lead 19 attached to the positive electrode 11 extends through a through hole of the insulating plate 17 toward the sealing component 16, and a negative electrode lead 20 attached to the negative electrode 12 extends through the outside of the insulating plate 18 toward the bottom portion of the case main body 15. For example, the positive electrode lead 19 is connected by, for example, welding to the lower surface of a filter 22 serving as the base plate of the sealing component 16. A cap 26 serving as the top of the sealing component 16 electrically connected to the filter 22 functions as a positive electrode terminal. The negative electrode lead 20 is connected by, for example, welding to the inner surface of the bottom portion of the case main body 15. The case main body 15 functions as a negative electrode terminal. In this embodiment, a current interrupt device (CID) and a gas discharge mechanism (safety valve) are provided in the sealing component 16. The current interrupt device is not essential and may be omitted. A gas discharge mechanism may be further provided in the bottom portion of the case main body 15.

The case main body 15 is, for example, a metal case having a bottomed cylindrical shape. A gasket 27 is provided between the case main body 15 and the sealing component 16 to ensure hermeticity in the battery case. The case main body 15 preferably includes an extended portion 21 that supports the sealing component 16, the extended portion 21 being formed by, for example, pressing a side portion from the outside. Preferably, the extended portion 21 is circularly arranged in the circumferential direction of the case main body 15 and supports the sealing component 16 on its top surface.

The sealing component 16 includes the filter 22 having a filter opening portion 22a and a valve element arranged on the filter 22. The valve element blocks the filter opening portion 22a of the filter 22 and will break when the internal pressure of the battery is increased by heat generation due to an internal short-circuit. In this embodiment, a lower valve body 23 and an upper valve body 25 are provided as the valve element. Furthermore, an insulating member 24 arranged between the lower valve body 23 and the upper valve body 25 and the cap 26 having a cap opening portion 26a are provided. Members included in the sealing component 16 have, for example, a disk or ring shape, and the members except for the insulating member 24 are electrically connected together. Specifically, the filter 22 and the lower valve body 23 are connected together at their peripheral portions. The upper valve body 25 and the cap 26 are also connected together at their peripheral portions. The lower valve body 23 and the upper valve body 25 are connected together at their central portions and have the peripheral portions with the insulating member 24 provided therebetween. In case of an increase in internal pressure by heat generation due to an internal short-circuit, for example, the lower valve body 23 breaks at a thin portion, so that the upper valve body 25 bulges toward the cap 26 to separate from the lower valve body 23, thereby breaking the electrical connection therebetween.

<Positive Electrode>

The positive electrode includes the positive electrode current collector formed of, for example, metal foil and the positive electrode mixture layer on the positive electrode current collector. For the positive electrode current collector, for example, foil composed of a metal, such as aluminum, stable in the potential range of the positive electrode or a film having a surface layer composed of the metal can be used. Preferably, the positive electrode contains tungsten and a phosphate compound and further contains a conductive agent and a binder. The expression "the positive electrode contains tungsten" indicates that the positive electrode contains a tungsten-containing lithium transition metal oxide serving as a positive electrode active material or contains a tungsten compound in the positive electrode mixture layer. More preferably, each of the positive electrode active material and the positive electrode mixture layer contains tungsten or the tungsten compound. As the tungsten compound, a tungsten oxide is preferred. The positive electrode can be produced by, for example, applying a positive electrode mixture slurry containing the positive electrode active material, the binder, and so forth to the positive electrode current collector, drying the resulting coating film, and performing rolling to form the positive electrode mixture layer on each surface of the current collector.

The lithium transition metal oxide is preferably an oxide represented by the general formula $Li_{1+x}M_aO_{2+b}$ (where in the formula, $x+a=1$, $-0.2<x\leq0.2$, $-0.1\leq b\leq0.1$, and M contains at least one metal element selected from the group consisting of nickel (Ni), cobalt (Co), manganese (Mn), and aluminum (Al)). M is preferably at least Ni. The lithium transition metal oxide preferably contains Co and Mn in addition to Ni, and also, preferably, contains Al in addition to Ni, Co, and Mn or in place of Mn.

The proportion of Ni in M is preferably 30% or more by mole. An example of the lithium transition metal oxide is a lithium nickel cobalt manganese oxide which contains $Ni^{3+}$ and in which the molar ratio of Ni>the molar ratio of Mn, in which the molar ratio of Ni to Co to Mn is, for example, 3:5:2, 4:3:3, 5:2:3, 5:3:2, 6:2:2, 7:1:2, 7:2:1, or 8:1:1. In lithium nickel cobalt aluminum oxide, the molar ratio of Ni to Co to Al is, for example, 80:15:5, 85:12:3, or 90:7:3.

Examples of a metal element contained in the lithium transition metal oxide include, in addition to Ni, Co, and Mn, transition metal elements such as zirconium (Zr), alkali metal elements, alkaline-earth metal elements, and group 12 to 14 elements. Specific examples thereof include boron (B), magnesium (Mg), aluminum (Al), titanium (Ti), chromium (Cr), iron (Fe), copper (Cu), zinc (Zn), niobium (Nb), molybdenum (Mo), tantalum (Ta), tin (Sn), sodium (Na), potassium (K), barium (Ba), strontium (Sr), and calcium (Ca). For example, Zr has the function of stabilizing the crystal structure of the lithium transition metal oxide.

The lithium transition metal oxide is formed of, for example, secondary particles (that are not disintegrated by, for example, ultrasonic dispersion into primary particles) formed by the aggregation of primary particles. The particle size of the lithium transition metal oxide is not particularly limited, and the lithium transition metal oxide preferably has a volume average particle size of 0.1 μm to 20 μm as measured by a laser diffraction method. When the lithium transition metal oxide has a particle size within the range described above, good ion conductivity and good electron conductivity of the positive electrode mixture layer are easily provided. The specific surface area of the lithium transition metal oxide measured by a BET method is preferably large in view of, for example, the retainability and diffusibility of an electrolytic solution.

The content of W in the lithium transition metal oxide is preferably 0.05% or more by mole and 10% or less by mole, more preferably 0.1% or more by mole and 5% or less by mole, particularly preferably 0.2% or more by mole and 3% or less by mole based on metal elements, excluding Li, of the lithium transition metal oxide.

W can be incorporated into the oxide by, for example, mixing and firing a composite oxide containing, for example, Ni, Co, and Mn, a lithium compound such as lithium carbonate or lithium hydroxide, and a tungsten compound such as tungsten oxide to synthesize the lithium transition metal oxide. W preferably forms a solid solution with the lithium transition metal oxide. W may also be precipitated on boundaries of the primary particles or surfaces of the secondary particles in the form of oxide or metal.

The formation of the solid solution of W with the lithium transition metal oxide and the solid solubility of W can be identified by cutting the particles or grinding surfaces of the particles and analyzing the inner portions of the particles using, for example, Auger electron spectroscopy (AES), secondary ion mass spectrometry (SIMS), transmission electron microscopy (TEM)-energy dispersive X-ray spectrometry (EDX).

The contents of the phosphate compound and the tungsten compound in the positive electrode mixture layer are preferably 0.01% or more by weight and 10% or less by weight, 0.05% or more by weight and 5% by weight, particularly preferably 0.1% or more by weight and 3% or less by weight based on the total amount of the positive electrode active material. The particle size of each of the phosphate compound and the tungsten compound is preferably smaller than that of the positive electrode active material and is, for example, 25% or less of the average particle size of the positive electrode active material.

The average particle size of the phosphate compound was determined as follows: 100 phosphate compound particles were randomly selected from the phosphate compound particles observed with a scanning electron microscope (SEM), the lengths of the longitudinal axis and the transverse axis of each of the particles were measured, and the average thereof was defined as the particle size of the phosphate compound. When the phosphate compound is present in the form of an aggregate, the particle size thereof is defined as the particle size of a particle serving as the smallest unit included in the aggregate.

The average particle size of the tungsten compound was determined in the same way as the average particle size of the phosphate compound.

As the phosphate compound incorporated into the positive electrode mixture layer, for example, at least one selected from the group consisting of lithium phosphate, lithium dihydrogen phosphate, cobalt phosphate, nickel phosphate, manganese phosphate, potassium phosphate, and ammonium dihydrogen phosphate is used. Among these, lithium phosphate is particularly preferably used. The tungsten compound incorporated into the positive electrode mixture layer is preferably, but not necessarily, $WO_3$, which contains tungsten with an oxidation number of 6, which is the most stable oxidation state.

The phosphate compound and the tungsten compound can be mechanically mixed with, for example, the positive electrode active material to be attached to surfaces of the active material particles. Alternatively, in a step of mixing the conductive agent and the binder together to form the positive electrode mixture slurry, the phosphate compound and the tungsten compound may be incorporated into the positive electrode mixture layer by addition of the phosphate compound and the tungsten compound thereto. Preferably, the phosphate compound and the tungsten compound are incorporated into the positive electrode mixture layer by the former method. Thereby, the phosphate compound and the tungsten compound can be efficiently arranged in the vicinities of the surfaces of the active material particles.

The presence of the phosphate compound and the tungsten compound at the positive electrode enables the adjustment of the rate of reaction in which tungsten in the lithium transition metal oxide or the tungsten compound in the positive electrode mixture layer is partially dissolved, thereby forming a good surface film on the negative electrode. The resulting film, which contains tungsten eluted from the positive electrode, on the negative electrode may be formed of a single layer composed of a mixture of tungsten and a reductive degradation product of the electrolytic solution or may be formed of a stack including two layers, one of the two layers being composed of tungsten, and the other being composed of the reductive degradation product of the electrolytic solution.

The conductive agent is used in order to increase the electrical conductivity of the positive electrode mixture layer. Examples of the conductive agent include carbon materials such as carbon black, acetylene black, Ketjen black, and graphite. These may be used separately or in combination of two or more.

The binder is used in order to maintain a good contact state between the positive electrode active material and the conductive material and enhance the bondability of the positive electrode active material and so forth to a surface of the positive electrode current collector. Examples of the binder include fluorine-based resins such as polytetrafluoroethylene (PTFE) and polyvinylidene fluoride (PVdF), polyacrylonitrile (PAN), polyimide-based resins, acrylic-based resins, and polyolefin-based resins. These resins may be used in combination with carboxymethyl cellulose (CMC), its salts (e.g., CMC-Na, CMC-K, and CMC-$NH_4$; and partially neutralized salts may also be usable), polyethylene oxide (PEO), and so forth. These may be used separately or in combination of two or more.

<Negative Electrode>

As the negative electrode, a known negative electrode can be used. For example, the negative electrode is produced by mixing a negative electrode active material and the binder with water or an appropriate solvent and applying the resulting mixture to the negative electrode current collector, followed by drying and rolling. For the negative electrode current collector, a conductive thin-film mem, in particular, foil composed of a metal such as copper or foil composed of an alloy, stable in the potential range of the negative electrode, a film having a metal surface composed of, for example, copper, or the like is preferably used. For the binder, as with the positive electrode, PTFE or the like can be used. However, for example, a styrene-butadiene copolymer (SBR) or a modified product thereof is preferably used. The binder may be used in combination with a thickener such as CMC.

As the negative electrode active material, any material capable of reversibly intercalating and deintercalating lithium ions may be used. Examples thereof include carbon materials, metals capable of forming an alloy with lithium, and alloy compound containing the metals. Examples of the carbon materials that can be used include graphite such as natural graphite, non-graphitizable carbon, and artificial graphite, and coke. Examples of the metal compounds include metal compounds each containing at least one metal capable of forming an alloy with lithium. In particular, as an element capable of forming an alloy with lithium, silicon or tin is preferred. Silicon oxide or tin oxide, in which silicon or tin is bonded to oxygen, may also be used. A mixture of the carbon material and a compound of silicon or tin may also be used. Furthermore, a material such as lithium titanate having a higher charge-discharge potential with respect to lithium metal than carbon materials and so forth may be used.

<Separator>

As the separator, a separator having higher oxidation resistance than polyethylene can be used. Examples of a material having higher oxidation resistance than polyethylene include polypropylene, aramid, resins having good heat resistance, and inorganic compounds such as ceramics. Among these, a material containing polypropylene as a main component is preferred from the viewpoint of easily forming highly uniform pores. An example thereof is a three-layer structure (PP/PE/PP) including a polyethylene layer serving as the central layer and polypropylene layers provided on both sides thereof, the polypropylene layers serving as surface layers. In particular, a single layer that is composed of polypropylene and that does not contain polyethylene, which has low oxidation resistance, is more preferred from the viewpoint of forming more uniform pores.

As the polypropylene, a high-crystallinity isotactic polypropylene is preferred because a porous structure is easily formed.

The separator may have a surface coated with, for example, an aramid resin. A filler layer containing an inorganic filler may be formed at the interface between the separator and at least one of the positive electrode and the negative electrode. Examples of the inorganic filler include oxides each containing at least one of titanium (Ti), aluminum (Al), silicon (Si), and magnesium (Mg). The filler layer can be formed by, for example, applying a slurry containing the filler to a surface of the separator.

The separator can be produced by a dry or wet film formation method. From the viewpoint of forming uniform pores, the separator is preferably produced by the dry film formation method.

The thickness of the separator according to the embodiment is preferably, but not necessarily, usually 5 to 100 μm, preferably 10 to 50 μm. The porosity thereof is usually in the range of 30% to 80%, preferably 40% to 65%.

With regard to the oxidation resistance of the separator, for example, the highest occupied molecular orbital (HOMO) energy can be used as an index. The highest occupied molecular orbital energy can be calculated using a quantum-chemical calculation method. Specifically, in the case where the calculation is performed with commercially available first principle molecular orbital calculation software using the density functional theory (B3LYP) and 6-31G(d) as the basis function, the highest occupied molecular orbital energy of a polyethylene is found to be −7.45 eV, and the highest occupied molecular orbital energy of a polypropylene is found to be −7.69 eV. This indicates that the polypropylene has higher oxidation resistance. In the cases of using a separator having oxidation resistance equal to or lower than the polyethylene, the separator is degraded by oxidation during battery charging and traps tungsten eluted from the positive electrode to fail to form a film sufficiently containing tungsten on the negative electrode.

Figure 2:
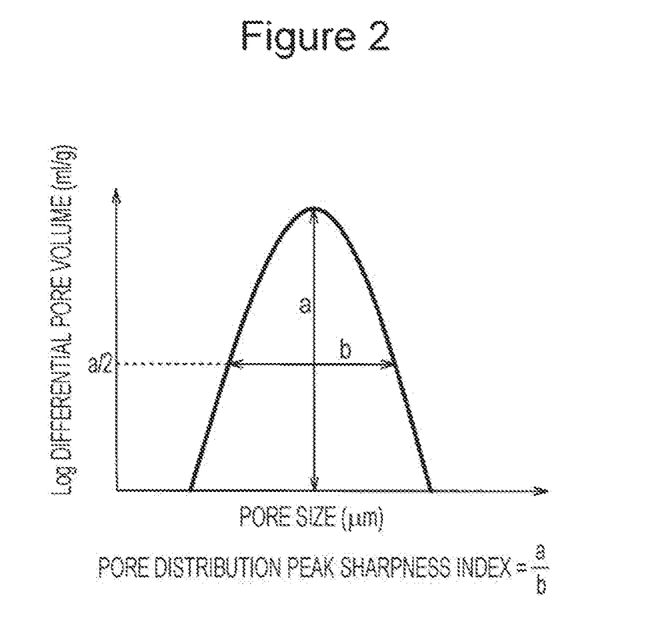
FIG. 2 is a graph illustrating how to determine the pore distribution peak sharpness index of a separator.

The separator preferably has a pore distribution peak sharpness index of 40 or more in the range of 0.01 μm to 10 μm as calculated using formula 1 described below. If the pore distribution peak sharpness index is less than 40, tungsten is trapped in smaller pores in the separator because of a wide pore distribution; thus, a uniform film cannot be formed on the negative electrode to fail to sufficiently improve the low-temperature output. The upper limit of the pore distribution peak sharpness index is not particularly limited and may be set in view of, for example, the mechanical strength, ease of production, and production cost of the separator. In the case where the separator has multiple pore distribution peaks, the maximum value of Log differential pore volume is used as the peak value:

pore distribution peak sharpness index=(peak value of Log differential pore volume)/(maximum pore size−minimum pore size at position corresponding to ½ peak value of Log differential pore volume). formula 1:

The pore distribution peak sharpness index will be described below with reference to FIG. 2. In the graph illustrated in FIG. 2, the horizontal axis represents the pore size (μm), and the vertical axis represents Log differential pore volume (ml/g). The peak sharpness index is defined as a value obtained by dividing the peak value a by the difference (i.e., b) between the maximum pore size and the minimum pore size at a position (i.e., a/2) corresponding to ½ the peak value a of Log differential pore volume. The pore size of the separator and Log differential pore volume can be calculated by, for example, pore distribution measurement with a mercury porosimeter. Log differential pore volume indicates the pore volume per unit mass of the separator.

<Nonaqueous Electrolyte>

The nonaqueous electrolyte contains, for example, a nonaqueous solvent and an electrolyte salt dissolved in the nonaqueous solvent. The nonaqueous electrolyte is not limited to a liquid electrolyte (nonaqueous electrolytic solution) and may be, for example, a solid electrolyte containing a gel-like polymer. Examples of the nonaqueous solvent that can be used include esters, ethers, nitriles, amides such as dimethylformamide, and solvent mixtures each containing two or more thereof. A sulfone group-containing compound such as propane sultone may also be used. The nonaqueous solvent may contain a halogen-substituted solvent in which at least one hydrogen atom of each of the solvents is replaced with an atom of a halogen such as fluorine.

Examples of the esters include cyclic carbonates such as ethylene carbonate (EC), propylene carbonate (PC), butylene carbonate, and vinylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone (GBL) and γ-valerolactone (GVL); and chain carboxylates such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

Examples of the halogen-substituted solvent include fluorinated cyclic carbonates such as fluoroethylene carbonate (FEC); fluorinated chain carbonates; and fluorinated chain carboxylates such as fluoromethyl propionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiC(C_2F_5SO_2)$, $LiCF_3CO_2$, $Li(P(C_2O_4)F_4)$, $Li(P(C_2O_4)F_2)$, $LiPF_{6-x}(C_nF_{2n+1})_x$ (where 1<x<6, n represents 1 or 2), borates such as $LiB_{10}Cl_{10}$, LiCl, LiBr, LiI, chloroborane lithium, lower aliphatic lithium carboxylates, $Li_2B_4O_7$, $Li(B(C_2O_4)_2)$, [lithium bis(oxalato)borate (LiBOB)], and $Li(B(C_2O_4)F_2)$, and imide salts such as $LiN(FSO_2)_2$, $LiN(ClF_{2l+1}SO_2)(C_mF_{2m+1}SO_2)$ {where l and m each represent an integer of 1 or more}. These lithium salts may be used separately or in combination as a mixture of two or more of them. Among these, in view of, for example, ionic conductivity and electrochemical stability, at least a fluorine-containing lithium salt is preferably used, and for example, $LiPF_6$ is preferably used. In particular, the combination use of the fluorine-containing lithium salt and a lithium salt containing an oxalato complex serving as an anion (for example, LiBOB) is preferred because a stable film is formed on the surface of the negative electrode even in a high-temperature environment. The concentration of the lithium salt is preferably 0.8 to 1.8 mol per liter of the nonaqueous solvent. To achieve a higher output, in particular, the concentration is more preferably 1.2 to 1.5 mol.

Figure 3:
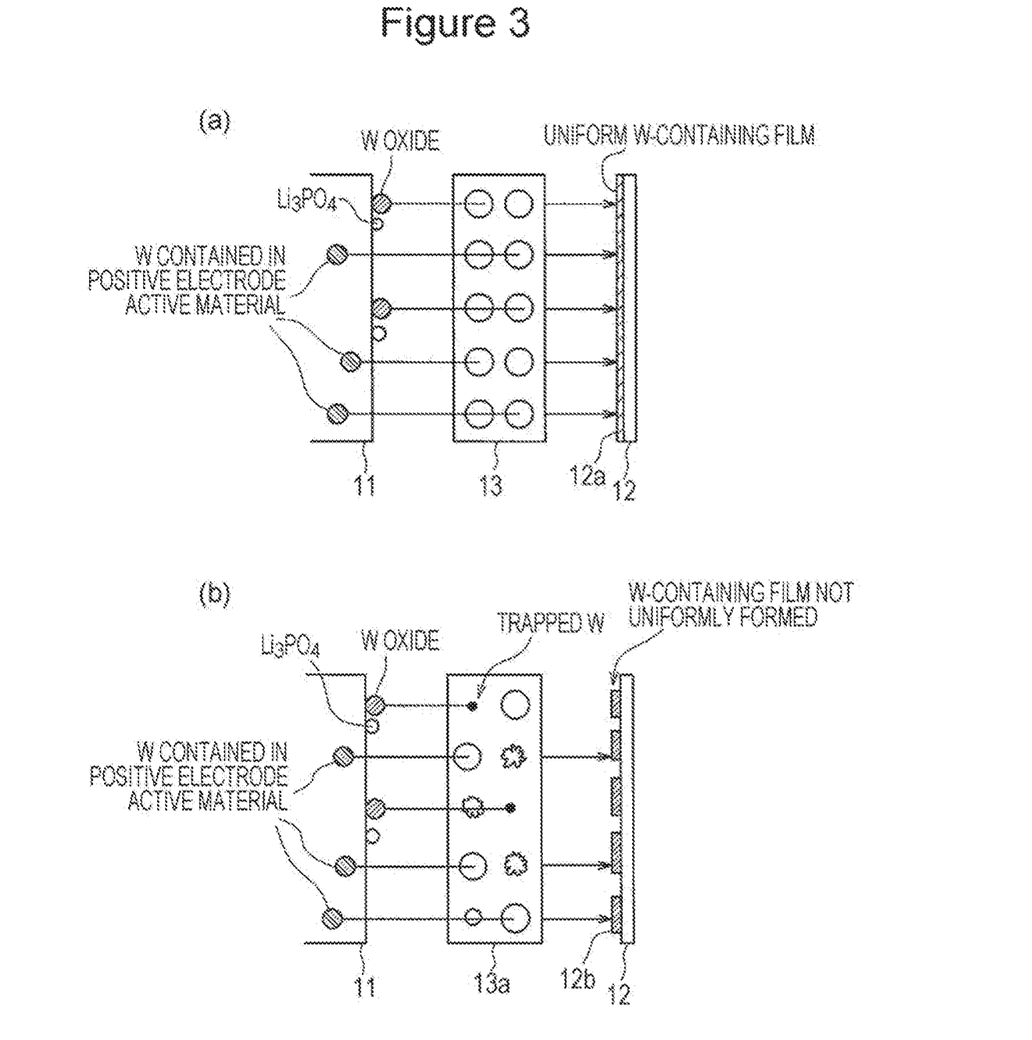

In the nonaqueous electrolyte secondary battery 10 according to the embodiment as described above, as illustrated in FIG. 3(*a*), a good (low-resistance) surface film 12*a* containing tungsten originating from the positive electrode can be formed on the negative electrode 12 by changing the rate of dissolution of tungsten in the nonaqueous electrolyte with the positive electrode 11 containing tungsten and the phosphate compound. The separator 13 contains a material having higher oxidation resistance than polyethylene and has a pore distribution peak sharpness index of 40 or more. This can inhibit the degradation of the separator 13 due to oxidation, so that tungsten eluted from the positive electrode 11 is not trapped by the oxidation effect of the separator 13; thus, the good (low-resistance) surface film 12*a* can be uniformly formed on the negative electrode 12. As a result, an increase in the resistance of the negative electrode 12 of the nonaqueous electrolyte secondary battery 10 can be inhibited even in a low-temperature environment, so that the nonaqueous electrolyte secondary battery 10 has improved low-temperature output characteristics.

With reference to a comparative embodiment illustrated in FIG. 3(*b*), in this embodiment, a separator 13*a* is composed of polyethylene. The degradation of the separator 13*a* due to oxidation is liable to cause tungsten eluted from the positive electrode 11 to be trapped by the separator 13*a*, thus failing to sufficiently form a film 12*b* containing W on the negative electrode 12. If the pore distribution peak sharpness index is less than 40, tungsten is trapped in smaller pores in the separator 13*a* because of a wide pore distribution, thus failing to uniformly form the film 12*b* on the negative electrode 12. In the comparative embodiment illustrated in FIG. 3(*b*), therefore, the negative electrode 12 has increased resistance under low-temperature conditions and cannot have sufficiently improved low-temperature output characteristics.

EXPERIMENTAL EXAMPLES

While the present disclosure will be further described by experimental examples, the present disclosure is not limited to these experimental examples.

Experimental Example 1

[Preparation of Positive Electrode Active Material]

Nickel cobalt manganese composite hydroxide prepared by mixing $NiSO_4$, $CoSO_4$, and $MnSO_4$ together and performing coprecipitation in an aqueous solution was fired to prepare a nickel cobalt manganese composite oxide. Next, the composite oxide, lithium carbonate, and tungsten oxide ($WO_3$) were mixed together with a grinding mortar in such a manner that the molar ratio of lithium to nickel cobalt manganese serving as the total of the transition metals to tungsten was 1.15:1.0:0.005. The mixture was fired at 900° C. for 10 hours in air and then pulverized to prepare a lithium transition metal oxide (positive electrode active material) containing W. The elementary analysis of the resulting lithium transition metal oxide by ICP revealed that the molar ratio of the elements with respect to the total of the transition metal elements was found to be Ni:Co:Mn:W=47:27:26:0.5.

[Production of Positive Electrode]

The positive electrode active material, 0.5% by weight of $WO_3$ with respect to the active material, and 2% by weight of $Li_3PO_4$ with respect to the active material were mixed together. The resulting mixture, carbon black, and poly (vinylidene fluoride) (PVDF) were mixed together in a weight ratio of 91:7:2. N-Methyl-2-pyrrolidone (NMP) serving as a dispersion medium was added and mixed with the mixture to prepare a positive electrode mixture slurry. The positive electrode mixture slurry was applied to aluminum foil serving as a positive electrode current collector. The coating was dried to form a positive electrode mixture layer on the aluminum foil. The current collector on which the positive electrode mixture layer had been formed was cut into a piece having a predetermined size. The piece was rolled. An aluminum tab was attached to the piece to form a positive electrode.

Observation of the resulting positive electrode plate with a scanning electron microscope (SEM) revealed that tungsten oxide having an average particle size of 150 nm and lithium phosphate having an average particle size of 100 nm were attached to the surface of the lithium-containing transition metal composite oxide. In the step of mixing the conductive agent and the binder, tungsten oxide and lithium phosphate were partially peeled from the surface of the positive electrode active material, in some cases, and thus were contained in the positive electrode without being attached to particles of the positive electrode active material, in some cases. The lithium phosphate was found to be attached to the tungsten oxide or present in the vicinity of the tungsten oxide.

[Production of Negative Electrode]

A graphite powder, carboxymethyl cellulose (CMC), and styrene-butadiene rubber (SBR) were mixed together in a weight ratio of 98.9:0.7:0.4, followed by addition of water. The mixture was stirred with a mixer (T.K. HIVIS MIX, manufactured by PRIMIX Corporation) to prepare a negative electrode mixture slurry. Next, the negative electrode mixture slurry was applied to copper foil serving as a negative electrode current collector. The resulting coating was dried and then rolled with reduction rollers. Thereby, a negative electrode including a negative electrode mixture layer on each surface of the copper foil was produced.
[Preparation of Separator]

A separator that was formed of a single layer of polypropylene and that had a pore distribution peak sharpness index of 164 was prepared. The pore distribution of the separator was measured with a measuring instrument under conditions as described below.

Measuring instrument: Autopore III 9410 available from Shimadzu Corporation

Measured pressure range: 20 psia (equivalent to 10 μm) to 20,000 psia (equivalent to 0.01 μm)
[Preparation of Nonaqueous Electrolyte]

Ethylene carbonate (EC), ethyl methyl carbonate (EMC), and dimethyl carbonate (DMC) were mixed in a volume ratio of 3:3:4. $LiPF_6$ was dissolved in the resulting solvent mixture in a concentration of 1.2 mol/L, and then 0.5% by mass of vinylene carbonate (VC) was dissolved therein to prepare a nonaqueous electrolyte.
[Production of Test Cell]

An aluminum lead was attached to the positive electrode. A nickel lead was attached to the negative electrode. The positive electrode and the negative electrode were spirally wound with the separator provided therebetween to produce a wound-type electrode assembly. The electrode assembly was placed in a battery case main body having a bottomed cylindrical shape. After the nonaqueous electrolyte was injected thereinto, the opening portion of the battery case main body was sealed with a gasket and a sealing component to produce a cylindrical nonaqueous electrolyte secondary cell. Hereinafter, the resulting battery is referred to as "cell A1".

Experimental Example 2

Test cell A2 was produced as in Experimental example 1, except that the amount of $Li_3PO_4$ in the positive electrode active material was 5% by weight.

Experimental Example 3

Test cell B1 was produced as in Experimental example 1, except that $Li_3PO_4$ was not incorporated into the positive electrode active material.

Experimental Example 4

Test cell A3 was produced as in Experimental example 2, except that a three-layer separator having a polypropylene/polyethylene/polypropylene structure and a pore distribution peak sharpness index of 44 was used as the separator.

Experimental Example 5

Test cell B2 was produced as in Experimental example 4, except that $Li_3PO_4$ was not incorporated into the positive electrode active material.

Experimental Example 6

Test cell A4 was produced as in Experimental example 2, except that a single-layer separator that was composed of polypropylene and that had a pore distribution peak sharpness index of 32 was used as the separator.

Experimental Example 7

Test cell B3 was produced as in Experimental example 6, except that $Li_3PO_4$ was not incorporated into the positive electrode active material.

Experimental Example 8

Test cell A5 was produced as in Experimental example 2, except that a single-layer separator that was composed of polyethylene and that had a pore distribution peak sharpness index of 3.

Experimental Example 9

Test cell B4 was produced as in Experimental example 8, except that $Li_3PO_4$ was not incorporated into the positive electrode active material.
[Evaluation of Output Characteristics]

After each of the cylindrical cells was produced as described above, at 25° C., constant-current charge was performed at a current of 1 It (800 mA) until the voltage reached 4.1 V, constant-voltage charge was performed at 4.1 V, and then constant-current discharge was performed at 800 mA until the voltage reached 2.5 V. The discharge capacity at this time was defined as the rated capacity of the cylindrical cell.

After each of the cylindrical cells A1 to A5 and B1 to B4 produced as described above was charged to 50% of the rated capacity, an output value at a state of charge (SOC) of 50% was determined using formula 2 from the maximum current value where charge can be performed for 10 seconds at a cell temperature of −30° C. and a discharge cutoff voltage of 2 V.

low-temperature output value (SOC: 50%)=(maximum current value)×(discharge cutoff voltage (2.0 V))   formula 2:

The output values of cells A1 and A2 were determined with reference to the output value of cell B1. The output value of cell A3 was determined with reference to the output value of cell B2. The output value of cell A4 was determined with reference to the output value of cell B3. The output value of cell A5 was determined with reference to the output value of cell B4. Table 1 lists the results.

TABLE 1

| Sample No. | Amount $Li_3PO_4$ mixed | Peak sharpness index | Type of separator | Low-temperature output (%) | Test cell |
|---|---|---|---|---|---|
| Experimental example 1 | 2 | 164 | PP | 112 | A1 |
| Experimental example 2 | 5 | 164 | PP | 114 | A2 |
| Experimental example 3 | 0 | 164 | PP | 100 | B1 |
| Experimental example 4 | 5 | 44 | PP/PE/PP | 109 | A3 |
| Experimental example 5 | 0 | 44 | PP/PE/PP | 100 | B2 |
| Experimental example 6 | 5 | 32 | PP | 99 | A4 |
| Experimental example 7 | 0 | 32 | PP | 100 | B3 |
| Experimental example 8 | 5 | 3 | PE | 99 | A5 |
| Experimental example 9 | 0 | 3 | PE | 100 | B4 |

Table 1 leads us to speculate that in the case where the positive electrode contains $Li_3PO_4$ and where the separator contains polypropylene (PP) and has a pore distribution peak sharpness index of 40 or more, it seems that the low-temperature output characteristics of the cells can be improved.

REFERENCE SIGNS LIST 10 nonaqueous electrolyte secondary battery, 11 positive electrode, 12 negative electrode, 13 separator, 14 electrode assembly, 15 case main body, 16 sealing component, 17, 18 insulating plate, 19 positive electrode lead, 20 negative electrode lead, 22 filter, 22a filter opening portion, 23 lower valve body, 24 insulating member, 25 upper valve body, 26 cap, 26a cap opening portion, 27 gasket

The invention claimed is:

1. A nonaqueous electrolyte secondary battery comprising an electrode assembly having a structure in which a positive electrode and a negative electrode are stacked with a porous separator provided therebetween, wherein the positive electrode contains $WO_3$ and $Li_3PO_4$, and the separator contains a material having higher oxidation resistance than a polyethylene and has a pore distribution peak sharpness index of 40 or more in the range of 0.01 μm to 10 μm as calculated using formula 1:

$$\text{pore distribution peak sharpness index} = (\text{peak value of Log differential pore volume})/(\text{difference between maximum pore size and minimum pore size at position corresponding to ½ peak value of Log differential pore volume}). \quad \text{formula 1:}$$

2. The nonaqueous electrolyte secondary battery according to claim 1, wherein the separator is composed of a polypropylene serving as a main component.

3. The nonaqueous electrolyte secondary battery according to claim 1, wherein the separator is formed of a single layer of a polypropylene.

4. The nonaqueous electrolyte secondary battery according to claim 1, wherein the negative electrode includes a surface film containing tungsten.

5. The nonaqueous electrolyte secondary battery according to claim 4, wherein the tungsten contained in the surface film originates from the positive electrode.

* * * * *